(No Model.)
W. PLANKINTON.
UNDERGROUND CONDUIT FOR ELECTRIC WIRES.
No. 273,305. Patented Mar. 6, 1883.
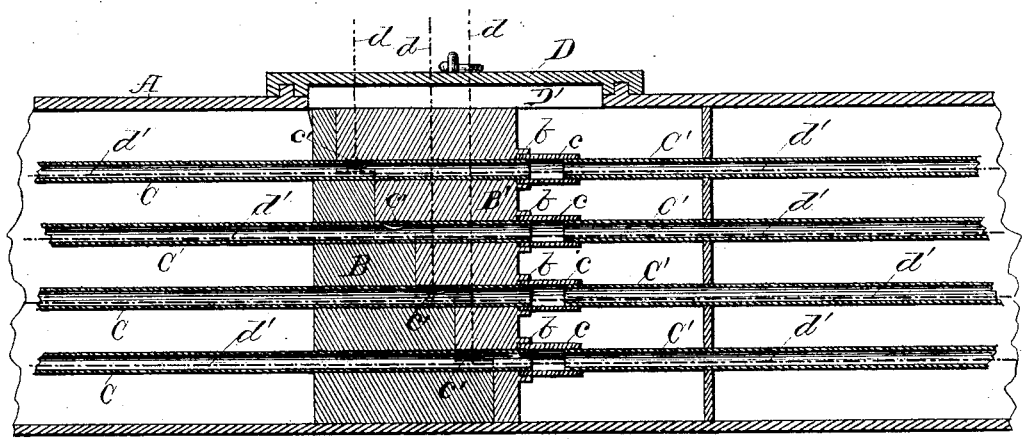
Fig. 1.
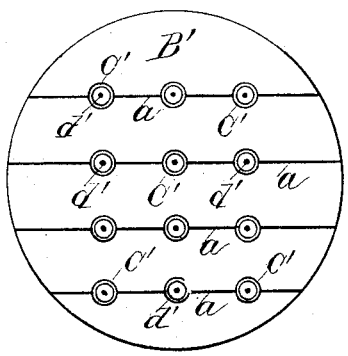
Fig. 2.
Fig. 3.
Witnesses:
E. G. Asmus
Adolph Klein
Inventor:
Wm Plankinton
By
Stout & Underwood,
Attorneys.

UNITED STATES PATENT OFFICE.

WILLIAM PLANKINTON, OF MILWAUKEE, WISCONSIN.

UNDERGROUND CONDUIT FOR ELECTRIC WIRES.

SPECIFICATION forming part of Letters Patent No. 273,305, dated March 6, 1883.

Application filed November 25, 1882. (No model.)

*To all whom it may concern:*

Be it known that I, WILLIAM PLANKINTON, of Milwaukee, in the county of Milwaukee, and in the State of Wisconsin, have invented certain new and useful Improvements in Underground Conduits for Electric Wires; and I do hereby declare that the following is a full, clear, and exact description thereof.

My invention relates to the laying of electric wires, and will be fully described hereinafter.

In the drawings, Figure 1 is a vertical longitudinal section of a broken section of my device. Fig. 2 is an elevation, partly in section, of the same; and Fig. 3 is an interior end view of one of the bridges.

A represents piping, of clay, cement, or any other suitable substance, and B B' a bridge, which is preferably of the same substance. This bridge is preferably cylindrical, and is of two sections, offset, as at $a$, to fit upon each other, and through section B, I pass the ends of conducting-pipes C, projecting them beyond its offsets a distance equal to the thickness of the adjacent portions of the section B', so that when the two sections are clamped together the ends of the pipes C will just reach through section B' to receive sleeves $c$, by which they are joined to pipes C'. About the pipe-openings on the outside of section B', I form annular projections $b$, to receive the ends of the sleeves adjacent to the section B' and to center them. I provide hand-openings $c'$ near the end of each of the pipes C, through which to attach the tapping-wires $d$ to the line-wires $d'$, and these tapping-wires are passed down through vertical openings in the section B', and are soldered to the line-wires, while the two sections of the bridge are separated for that purpose, as shown in Fig. 2, and then when the sections of the bridge are closed the wires may be tightened, as shown in Fig. 1, and connected to the building or tower wires; and should it ever be necessary to get at the openings $c'$, the wires $d$ $d$ may be detached from the house or tower wires, so as to slacken them, and then the section B' of the bridge may be moved away from the section B to expose the hand-openings; but when any of the wires are to be tested it will only be necessary to lift the cover D and slide the sleeves $c$ back on the pipes C' far enough to expose the line-wires between the ends of pipes C C'. The section B is slipped into the piping A after the pipe-sections C have been placed in it, and the section B' is slipped in through the other end, care being taken to place the bridge so that it will be accessible from the opening D'.

I propose making the bridge B B', as well as the piping, both large and small, of vitrified clay; but they may be made of cement or any other non-conductor of electricity; and I think it may be well to make the bridges of wood under some circumstances, and I propose to employ with my device any of the well-known devices for defeating induction.

What I claim as my invention, and desire to secure by Letters Patent, is—

1. The bridge consisting of sections B B', adapted to separate, and provided with offsets to facilitate return to place, in combination with the large pipe containing it, and the wire-piping supported by said bridge, substantially as set forth.

2. The combination of the sectional bridge with the piping C C', supported therein, and the sleeves $c$, adapted to unite the ends of said piping, substantially as set forth.

3. The line-wire piping having openings to receive the tapping-wire, in combination with the sectional bridge perforated to receive the said tapping-wire, substantially as set forth.

In testimony that I claim the foregoing I have hereunto set my hand, on this 27th day of October, 1882, in the presence of two witnesses.

WILLIAM PLANKINTON.

Witnesses:
S. S. STOUT,
H. G. UNDERWOOD.